United States Patent [19]

Stirling

[11] Patent Number: 5,226,106
[45] Date of Patent: Jul. 6, 1993

[54] OHMIC HEATING APPARATUS USING ELECTRODES FORMED OF CLOSED MICROPEROSITY MATERIAL

[75] Inventor: Robert Stirling, Merseyside, United Kingdom

[73] Assignee: Electricity Association Technology Limited, London, United Kingdom

[21] Appl. No.: 776,310

[22] PCT Filed: May 15, 1990

[86] PCT No.: PCT/GB90/00745
§ 371 Date: Nov. 18, 1991
§ 102(e) Date: Nov. 18, 1991

[87] PCT Pub. No.: WO90/14740
PCT Pub. Date: Nov. 29, 1990

[30] Foreign Application Priority Data

May 18, 1989 [GB] United Kingdom ............... 8911442

[51] Int. Cl.5 .................. H05B 3/60; H05B 3/03; A23L 3/005; C25B 11/12
[52] U.S. Cl. .................... 392/314; 99/451; 204/294; 392/320; 392/338
[58] Field of Search .................... 392/311-338; 99/451; 204/294, 291

[56] References Cited

U.S. PATENT DOCUMENTS

| 3,870,468 | 3/1975 | Neti | 392/480 X |
| 4,220,846 | 9/1980 | Rice et al. | 392/483 X |
| 4,417,132 | 11/1983 | Simpson | 392/320 |
| 4,434,357 | 2/1984 | Simpson et al. | 392/320 |
| 4,461,347 | 7/1984 | Layton et al. | 392/487 X |
| 4,959,525 | 9/1990 | Stirling | 392/314 |

FOREIGN PATENT DOCUMENTS

| 32840 | 7/1981 | European Pat. Off. |
| 2153577 | 5/1973 | Fed. Rep. of Germany |
| 2320752 | 11/1974 | Fed. Rep. of Germany |
| 2334260 | 1/1977 | France |
| 51-073507 | 6/1976 | Japan |
| 54-001394 | 1/1979 | Japan |
| 62-252942 | 11/1987 | Japan |
| 64-000652 | 5/1989 | Japan |
| 89/00384 | 1/1989 | World Int. Prop. O. |

Primary Examiner—Anthony Bartis
Attorney, Agent, or Firm—Kinney & Lange

[57] ABSTRACT

An ohmic heating apparatus for heating flowable media which is flowing through a conduit comprises electrodes exposed to the flowing media and supply means connected to the electrodes and to the media to pass a heating current through the flowable media. The electrodes are made of a material of closed microporosity having a resistance to surface fouling. The material of closed microporosity is preferably made of vitreous carbon.

2 Claims, 1 Drawing Sheet

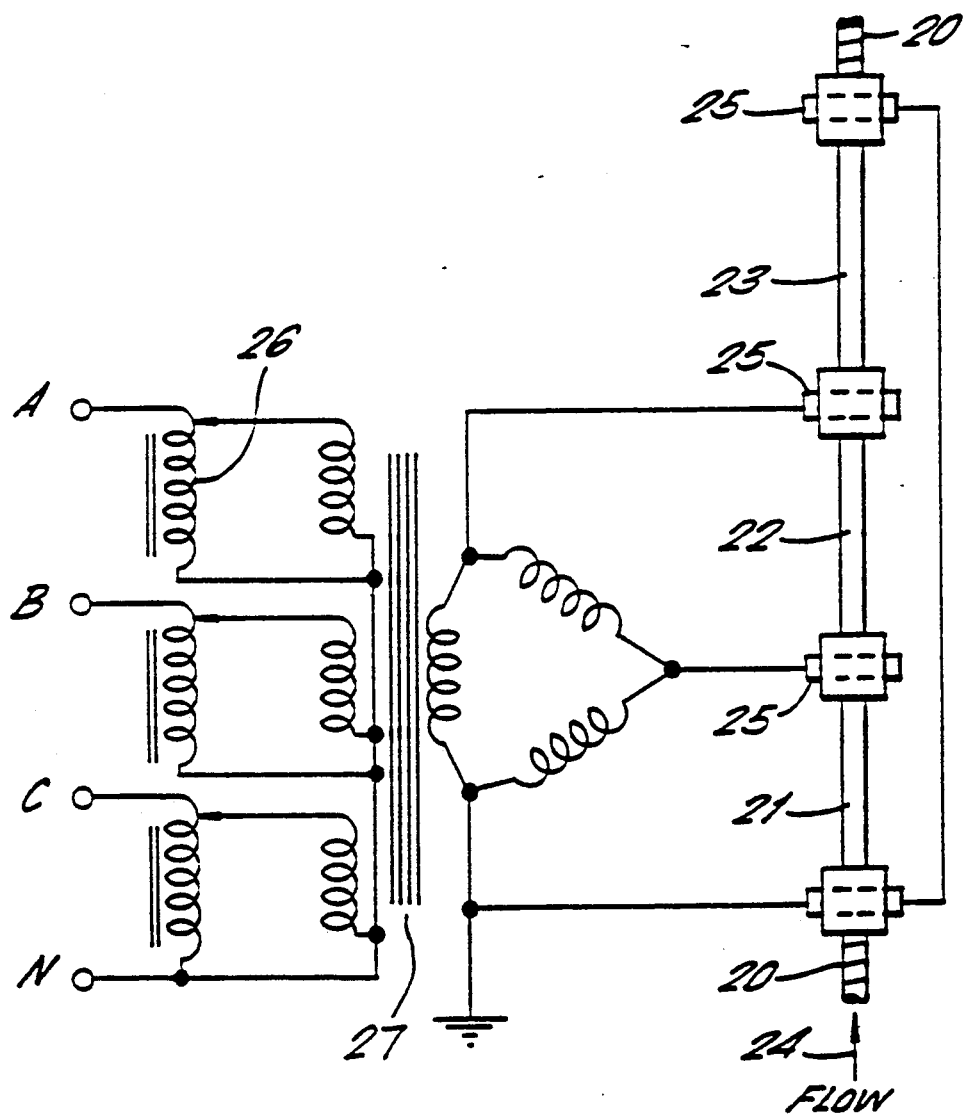

OHMIC HEATING APPARATUS USING ELECTRODES FORMED OF CLOSED MICROPEROSITY MATERIAL

This invention relates to surface fouling resistant materials, and in particular to such materials for use as structures which have to contact flowable media which deposit surface fouling deposits.

Ohmic heating is a well known technique for heating flowable media and is well established in the food processing industry where it meets the need to cook or sterilise foodstuffs. The basic principle is to arrange for an electric current to flow directly in the medium between a pair of electrodes. Such direct ohmic heating cf the medium can permit high rates of heat input to the medium thus enabling rapid heating. Proposals for ohmically heating liquids, specifically pasteurising milk, are described in the article "Pasteurisation of Milk by Electricity" by McDowall, pp 275-291 The New Zealand Journal of Science and Technology, February 1929. In the "Electro-Pasteur" described in this article, electric current flows between electrodes spaced at intervals along a pipe through which milk is flowing. The current flow is therefore essentially parallel to the flow of milk. Reference may also be made to GB-B-2067390 which describes a particularly advantageous form of electrode for use in ohmic heating apparatus. Platinum or platinum coated electrodes are commonly used to provide corrosion resistance in such devices In addition to heating foodstuffs, there is also a requirement to heat flowable media such as corrosive chemical reagents up to a required reaction temperature. Hitherto, attempts to apply the technique of ohmically heating such reagents have met with difficulties associated with surface fouling of the electrodes, in particular the deposition of crystals from the reagents. With many reagents the crystal growth is itself electrically insulating so that continued deposition results in a non-functional electrode. Often the deposition process is sufficiently rapid to render ohmic heating unworkable due to the frequency of having to clean or replace the fouled electrodes.

In accordance with the present invention, surface fouling resistant means arranged to contact flowable media comprises material of closed microporosity.

It has been found experimentally that such materials are unexpectedly resistant to surface crystal growth. Whilst the reason why materials of closed microporosity should exhibit this property is not fully understood, it is presently believed that some other sorts of material surfaces are vulnerable to fouling because they allow for trapping of pockets of reagants in the open structures or pores cf the material surface. Such pockets may be the site for nucleation and crystal growth No such trapping of pockets of reagants may occur with materials of closed microporosity, thus rendering such materials resistant to surface fouling.

Conveniently, ohmic heating apparatus may comprise electrodes made of such closed microporosity material, as may other components in such apparatus where fouling by crystal deposition is detrimental. Preferably, the closed microporosity material is vitreous or glassy carbon. Conducting ceramics may also be suitable. It may be appreciated that although such materials are particularly suitable for structures which have to contact flowable media which rapidly deposit surface fouling crystals on other sorts of electrodes, their applicability is in fact to any sorts of flowable media where surface fouling might be a problem It may also be appreciated that the material may also have to be electrically conducting and chemically inert.

Another aspect of the invention is the use of closed microporosity materials for surface fouling resistant means arranged to contact flowable media.

An example of the invention will now be described with reference to the accompany drawing, the sale view of which illustrates an ohmic heating apparatus embodying the present invention.

In this figure, there is indicated generally at 20 a pipe for the flowable medium which is to be heated. The medium is typically corrosive chemical reagants which have to be heated to attain a desired reaction temperature. The pipe 20 is connected, in use, to means such as a positive displacement pump for producing a flow of the medium in the direction of arrow 24 through the pipe. Such means might comprise a pump conveying the reagants from one vat to another. As shown in the drawing, the pipe 20 has sections 21, 22 and 23 which are made so that the material flowing inside these sections is electrically insulated from the outside of the pipe. To achieve this the pipe sections may be made entirely from insulating materials, or the pipe sections may be internally lined with an insulating material. Typically, this material may be glass It is preferable that the insulating material employed is a "good" insulator, i.e. having a very low electrical conductivity, although the apparatus can be made to work provided the conductivity of the insulating material employed is less than that of the medium flowing in the pipe The insulating pipe sections 21, 22 and 23 space apart four vitreous carbon electrodes 25. The electrodes 25 are each arranged to have electrode surfaces which are exposed to medium flowing in the pipe 24. A three-phase autotransformer 26 connected to a three-phase step up transformer 27 is arranged to provide a variable alternating voltage supply, for example from the mains three-phase electricity supply at 440 V. The delta-connected secondary windings of the transformer 27 are connected to the electrodes 25 with one terminal of the secondary windings connected to earth and to the electrodes at either end of the heater portion of the pipe 20, i.e. the uppermost and lowermost electrodes 25 in FIG. 1. The other two terminals of the secondary winding are connected to respective ones of the two intermediate electrodes 25. It can be seen, therefore, that a different phase of alternating voltage is applied between each adjacent pair of electrodes 25, but in each case the R.M.S. voltage applied across the electrodes is the same. Having the outer two electrodes earthed minimises any risk cf current flowing in the medium either before the inlet or after the outlet of the heating portion of the pipe 20. Provision may be made to cool the interior surfaces of the pipe sections 21, 22 and 23 for example by forming these pipe sections as double-skinned pipes with a water-cooling jacket between the skins. Cooling the pipe sections has been found desirable to reduce fouling of the internal surfaces of these pipe sections. Alternatively, the internal lining of the pipe sections may themselves be of vitreous carbon, obviating the requirement for cooling.

I claim:

1. In an ohmic heating apparatus for heating electrically conductive flowable media flowing through a conduit, comprising at least one electrode exposed to the flowing media and supply means electrically connected to said at least one electrode and to the media flowing through the conduit to pass a heating current though the electrically conductive flowable media, the improvement comprising said at least one electrode made of closed microporosity material.

2. The ohmic heating apparatus of claim 1 wherein the electrode is made of vitreous carbon comprising the material of closed microporosity.

* * * * *

UNITED STATES PATENT AND TRADEMARK OFFICE
CERTIFICATE OF CORRECTION

PATENT NO. : 5,226,106
DATED : July 6, 1993
INVENTOR(S) : ROBERT STIRLING It is certified that error appears in the above-identified patent and that said Letters Patent is hereby corrected as shown below:

```
On the Title Page of the Patent,
  delete [54]  OHMIC HEATING APPARATUS USING
               ELECTRODES FORMED OF CLOSED
               MICROPEROSITY MATERIAL insert [54]  OHMIC HEATING APPARATUS USING
               ELECTRODES FORMED OF CLOSED
               MICROPOROSITY MATERIAL
```

Signed and Sealed this

Twenty-fifth Day of January, 1994

*Attest:*

BRUCE LEHMAN

*Attesting Officer*  *Commissioner of Patents and Trademarks*